United States Patent [19]

Schulz

[11] Patent Number: 5,054,836
[45] Date of Patent: Oct. 8, 1991

[54] GRIPPER MECHANISM HAVING SPRING-LOADED JAWS

[75] Inventor: Gordon R. Schulz, Villa Park, Calif.
[73] Assignee: Odetics, Inc., Anaheim, Calif.
[21] Appl. No.: 385,713
[22] Filed: Jul. 26, 1989
[51] Int. Cl.⁵ .......................... B25J 15/08; B66C 1/42
[52] U.S. Cl. ..................... 294/116; 294/907; 414/739; 414/932; 901/38; 901/39
[58] Field of Search .................. 294/86.4, 106, 110.1, 294/116, 907; 414/729, 739, 753, 932; 901/31, 36-39, 46

[56] References Cited

U.S. PATENT DOCUMENTS

| | | |
|---|---|---|
| 4,055,943 | 11/1977 | Reischert ........................ 294/116 X |
| 4,343,077 | 8/1982 | Satoh et al. .................... 294/116 X |
| 4,469,362 | 9/1984 | Schaarschmidt et al. ......... 294/116 |
| 4,473,147 | 9/1984 | Bouwman ....................... 294/116 X |
| 4,498,573 | 2/1985 | Anderson et al. ............... 294/116 X |

FOREIGN PATENT DOCUMENTS

| | | |
|---|---|---|
| 582175 | 11/1977 | U.S.S.R. ............................ 294/116 |
| 965655 | 10/1982 | U.S.S.R. ............................ 294/116 |
| 1006211 | 3/1983 | U.S.S.R. ............................ 294/116 |
| 1153467 | 3/1987 | U.S.S.R. ............................ 294/116 |

OTHER PUBLICATIONS

IBM Technical Disclosure Bulletin, vol. 17, No. 8, Jan. 1975, "Gripper Mechanism" by Sirico.

Primary Examiner—Johnny D. Cherry
Attorney, Agent, or Firm—Spensley Horn Jubas & Lubitz

[57] ABSTRACT

A gripper for grasping articles in an automatic or semi-automatic handling system includes spring-loaded jaws. No fasteners such as screws, pins, or the like are required to hold the jaws to the gripper assembly. The jaws are moved by way of motor-driven cams. During a grip mode, the cams do not contact the jaws, and the grip is achieved by way of the springs acting against rollers contacting the outside of the jaws. A worm on the motor shaft compresses a spring to buffer the deceleration of the motor. The spring applies a moment to worm gears which mate with the worm on the motor shaft. The gear shaft of each worm gear is operatively coupled to a respective camshaft. In this manner, the cams are locked.

15 Claims, 9 Drawing Sheets

GRIPPER MECHANISM HAVING SPRING-LOADED JAWS

BACKGROUND OF THE INVENTION

The present invention relates to the grasping of articles, and more particularly to a gripper having spring-loaded jaws, for quickly and reliably grasping and releasing articles compatible with the jaws, e.g., box-like articles. This type of gripper is used, for example, in an automated handling system. In general, the present invention relates to the grasping of articles compatible with the jaws of the gripper. However, for ease of discussion, reference to tape cassettes will be made herein.

Automated handling systems commonly are used to move an article from one point to another. For example, it commonly is desired to retrieve a particular cassette from among a library of cassettes, obtain information from the cassette, and then return the cassette to its designated position in the library. Sometimes the constant retrieval and return of cassettes is required; thousands of consecutive load and unload operations may be required to be performed in a single day. Thus, a gripper assembly for an automated handling system must be capable of quickly and reliably grasping and releasing cassettes.

One recently developed gripper grasps a box-like article between a stationary plate and a movable flat spring. This gripper is disclosed in U.S. Pat. No. 4,846,619 assigned to the same assignee as the present invention. The gripper is attached to an accesser which moves the gripper toward a targeted article contained in a storage bin or toward a destination point, e.g., a tape transport device. This gripper has many advantages in the handling of video cassettes. However, due to its construction, the gripper has a low degree of freedom with respect to the targeted article and to the destination point, and the gripper must be extremely accurately positioned before the article can be loaded or unloaded. Thus, the accesser has the burden of very accurately aligning the gripper with respect to a targeted article or destination point.

It is, of course, important that information on tape be protected. Thus, care must be taken to limit wear on the cassette housing. Physical rubbing and other touching of the cassette by the gripper should be minimized. Also, it is desirable for the gripper to have a high degree of freedom, so that even if a cassette is misaligned in its storage bin, the gripper is still able to function quickly and reliably.

SUMMARY OF THE INVENTION

The present invention is directed to a system for quickly and reliably grasping and releasing articles in an automatic or semi-automatic handling system.

The gripper of the present invention has two spring-loaded jaws for grasping an article. No fasteners, such as screws, pins, or the like, are required to hold the jaws to the remainder of the gripper assembly. The springs extend between a support member and the jaws and push the jaws against stationary members, e.g., rollers, fixed to the remainder of the gripper assembly. Motor-driven cams are used to open and close the jaws. The cams do not contact the jaws when the jaws are in the closed position; the grip is achieved solely by the springs acting against the stationary members, and there is no concern that the article will fly loose from the jaws due to a loss of motor power.

Additionally, the gripper is moved toward a targeted article by way of an accesser so that the article is situated between, but not in contact with, the jaws of the gripper. In the case where the accesser situates the gripper so that the cassette is located below a vertical registration surface on the gripper, the jaws are moved toward one another and into contact with the article, and the springs pull the article into the grasp of the jaws.. In this manner, the gripper draws the article into its grasp. If the accesser situates the gripper so that the vertical registration surface bears down on the cassette, then the springs pull the jaws so as to achieve accurate alignment between the cassette and the vertical registration surface. Thus, it is not necessary that the accesser accurately position the gripper with respect to the article to enable proper grasping to be achieved. Rather, the gripper has a high degree of freedom and precisely registers the article with respect to a vertical registration surface located on the gripper in a very short period of time. In this manner, even an article which is in a misaligned position can be quickly and reliably grasped. Furthermore, physical touching of the article is limited and thus wear on the article is minimized.

In a preferred embodiment of the present invention, a worm is splined to the shaft of a drive motor and mates with worm gears which are attached to shafts operatively coupled to the camshafts. The motor-driven worm drives the worm gears and thus the camshafts and associated cams. In this manner, the jaws are opened and closed.

The motor is de-energized when a sensor detects that the camshafts have rotated a predetermined amount. When cam rotation is stopped, e.g., when the worm gears contact associated hard stops, the action of the worm changes in that the worm moves up or down the motor shaft depending on the rotational direction of the motor shaft. A spring is located on the motor shaft and is compressed by the worm moving along the shaft. Thus, the deceleration of the motor is buffered by the spring acting against the worm. Also, the cams are locked by way of a moment applied to each of the worm gears through the spring acting on the worm. If motor deceleration is required to be buffered in both directions, two springs are situated on the motor shaft, one on either side of the worm. Each spring is seated on a slidable sleeve which is restricted in its motion along the motor shaft. Restriction may be by way of, for instance, a shoulder on the shaft or a retaining ring. In this manner, the springs are decoupled. That is, when the worm has moved from the neutral position, i.e., when the worm has moved up or down the motor shaft after cam rotation has been stopped, only one spring can axially impart force on the worm at any one time.

The gripper of the present invention achieves extremely precise registration within a very short period of time. It limits physical contact of the article by the gripper so that wear on the article is minimized. Additionally, the grip is achieved by way of springs acting against stationary members, and there is no danger of the grip being lost even if motor power is lost. Also, the gripping force is applied primarily in a shear plane (i.e., the most rigid plane) of an article to further minimize possible damage to the article. Furthermore, the deceleration of the motor is buffered by using a simple, compact arrangement of reliable, long-lasting components.

BRIEF DESCRIPTION OF THE DRAWINGS

The invention will be described with reference to the accompanying drawings, wherein.

DESCRIPTION OF THE PREFERRED EMBODIMENT

The following description is of the best presently contemplated mode of carrying out the invention. This description is made to illustrate the general principles of the invention, and is not to be viewed in a limiting sense. In particular, although the invention is described with reference to a cassette handling system, the invention may be used in other applications where other articles compatible with the jaws of the gripper are handled. The scope of the invention is best determined by reference to the accompanying claims.

Figure 1:
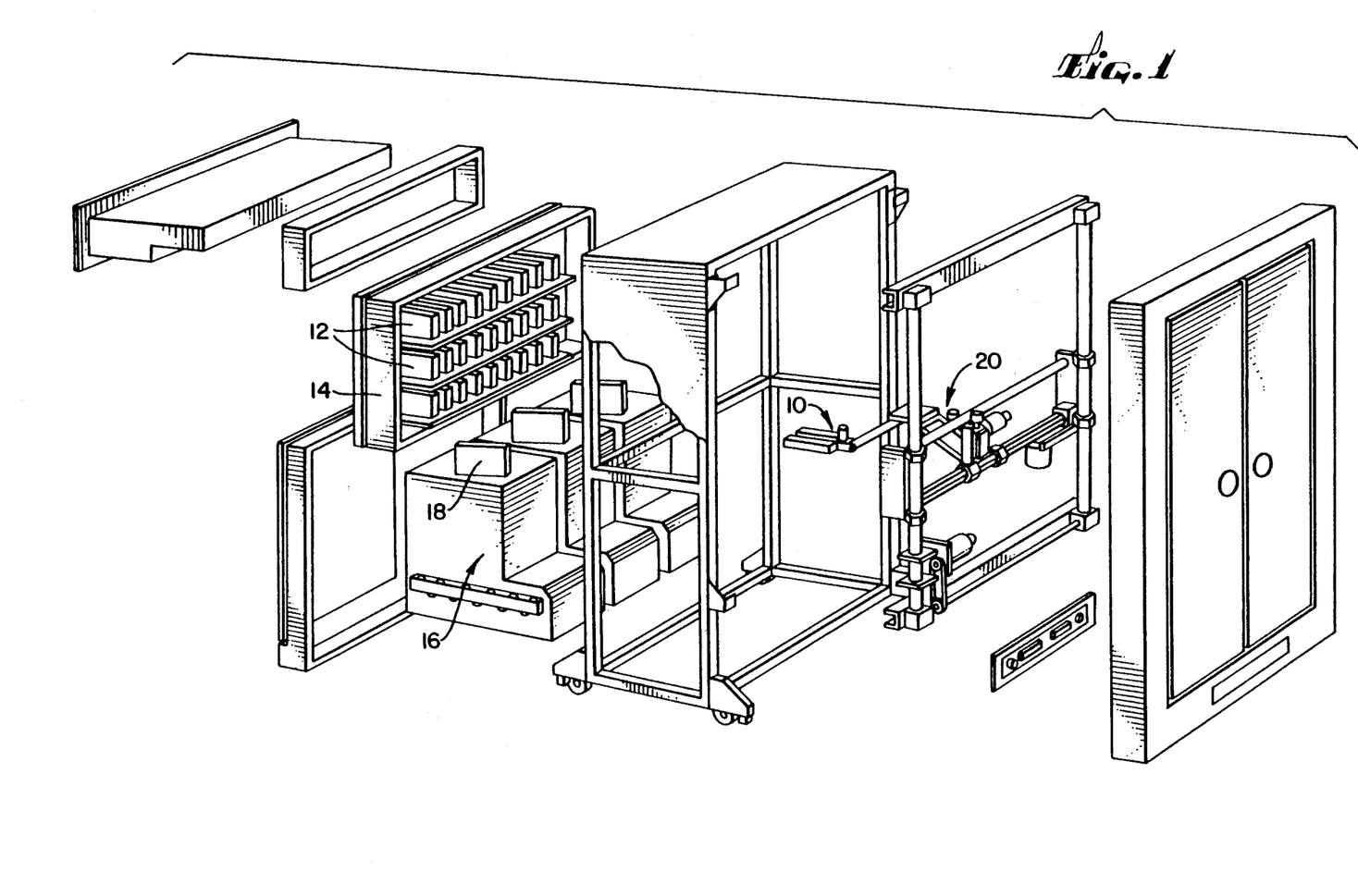
FIG. 1 is a perspective view of an automated cassette handling system incorporating the gripper of the present invention.

First, a general overview of the operation of the gripper 10 of the present invention will be given. FIG. 1 shows an example of an automated cassette handling system incorporating the gripper 10 of the present invention. A library of magnetic tape cassettes 12 is stored in rows of storage bins 14. Each cassette 12 is horizontally situated in an assigned storage bin 14 so that the tape-side is facing down. A number of tape transport devices 16 for playing cassettes are located below the storage bins 14. Each tape transport device 16 has a slot 18 into which a cassette 12 is inserted. When a targeted cassette 12 is to be retrieved from its storage bin 14, an accesser 20, controlled by a microcomputer (not shown), moves the gripper 10 toward the cassette 12. The accesser 20 has a relatively high degree of freedom with respect to the alignment of the gripper 10 with the cassette 12. For example, the gripper 10 can approach the cassette 12 from 3/16" from the top of the cassette 12.

Figure 8:
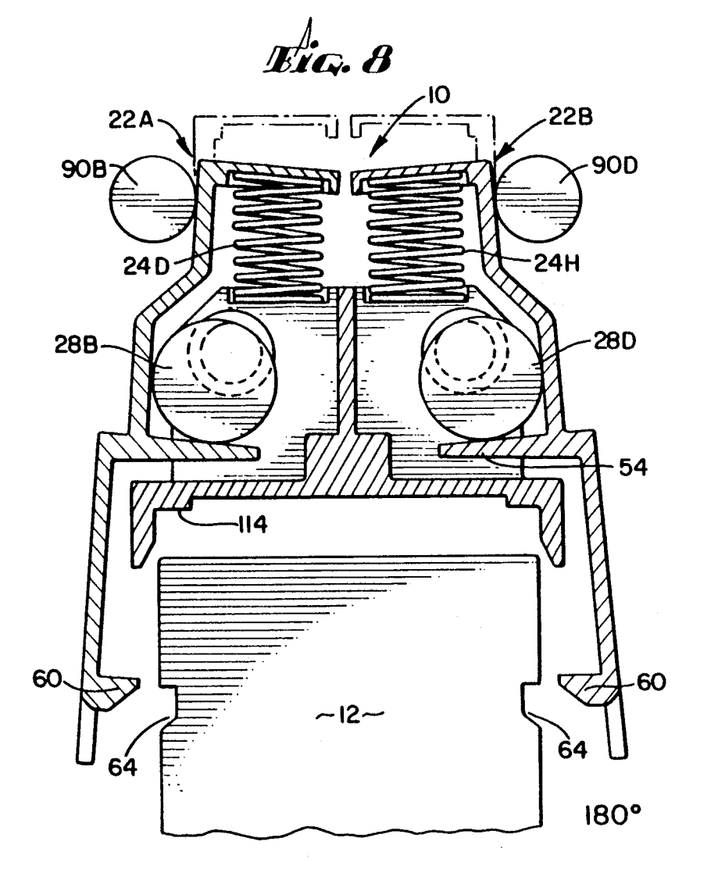
FIG. 8 is a sectional view of the gripper showing the relationship between the jaws, springs, cams, and rollers when the gripper is in an opened position.

FIG. 8 shows the gripper 10 positioned adjacent a cassette 12. The gripper 10 is designed to position a cassette 12 with respect to a surface 106 (FIG. 3) for achieving horizontal registration and a surface 114 (FIG. 8) for achieving vertical registration. The gripper 10 is situated so that the cassette 12 is between, but not in contact with, jaws 22A-B. Also, the cassette 12 is situated below the vertical registration surface 114. Actuation of a drive motor 23 (discussed in connection with FIGS. 12-15) is controlled by a microcomputer (not shown) based on detection signals received from various sensors. When the motor 23 is actuated, cams 28A-D (FIG.5) are driven so that the jaws 22A-B move toward each other. As the jaws 22A-B close, claws 60 of the jaws 22A-B engage in grooves 64 in the cassette 12 and the cassette 12 is pulled by the forces of the springs 24A-H so that the cassette 12 is drawn into the grasp of the jaws 22A-B. In this manner, the gripper 10 achieves extremely precise registration, e.g., 0.001", with respect to the vertical registration surface 114 within a very short period of time, e.g., 50 milliseconds. Thus, the gripper 10 has a high response time and can quickly and reliably perform thousands of consecutive load and unload operations. Also, other than the contact with the registration surfaces 106, 114, physical touching of the cassette 12 by the gripper 10 is limited to the claws 60 contacting the grooves 64 of the cassette 12. Moreover, when the jaws 22A-B are closed, the cams 28A-D do not contact the jaws 22A-B, and the grip is achieved solely by the force of springs 24A-H acting against rollers 90A-D situated on the outside of the jaws 22A-B.

When the cassette 12 is to be released, the motor 23 is energized, thereby driving the cams 28A-D. The cams 28A-D contact the jaws 22A-B and move the jaws 22A-B away from one another. The gripper 10 then releases the cassette 12 into the slot 18 of one of the tape transport devices 16. The accesser 20 is only required to position the cassette 12 within, for example, 3/16" above the slot 18 of the tape transport device 16. The downward and outward motions of the jaws 22A-B smoothly transport the cassette 12 down to the surface of the tape transport device 16. That is, the dynamics of the jaw movements prevent the cassette 12 from merely falling to the surface when the jaws 22A-B are opened. The gripper 10 returns the cassette 12 to a storage bin 14 in a similar manner.

Figure 2:
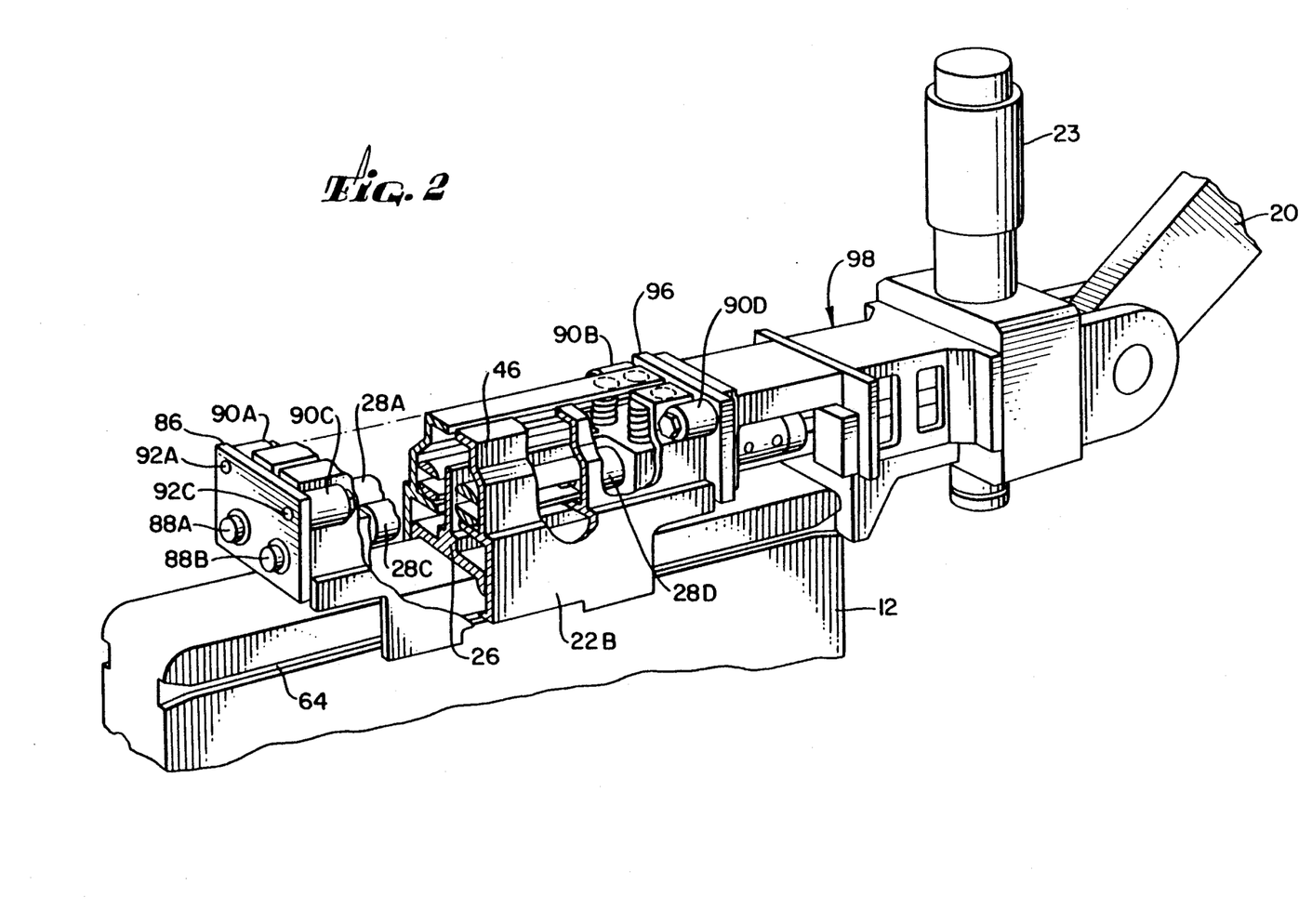
FIG. 2 is a partially cut-away perspective view of the gripper of the present invention attached to an accesser, showing a cassette being grasped by the gripper.
Figure 3:
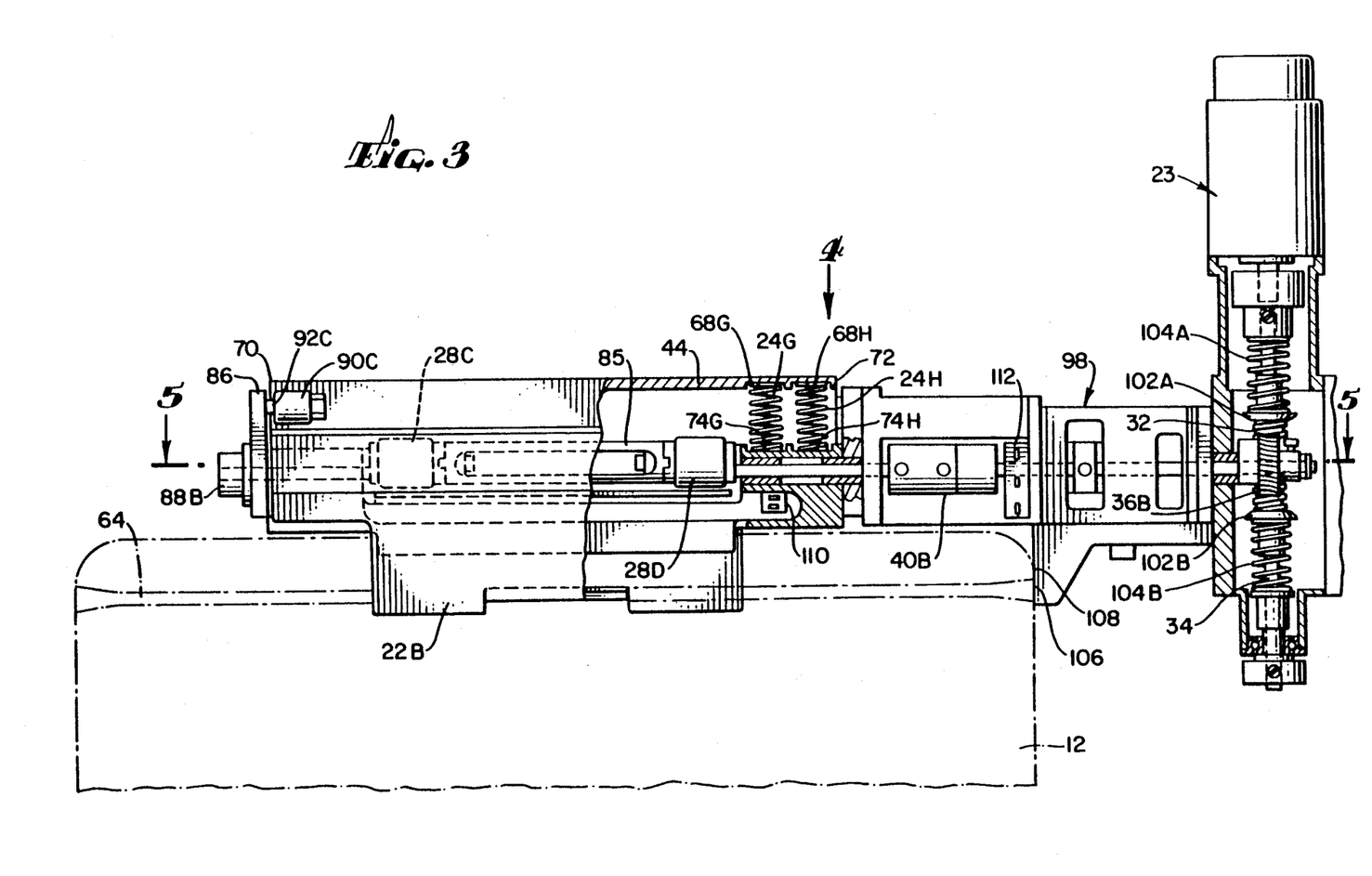
FIG. 3 is a partially cut-away side view of the gripper of the present invention, showing a cassette being grasped by the gripper.
Figure 4:
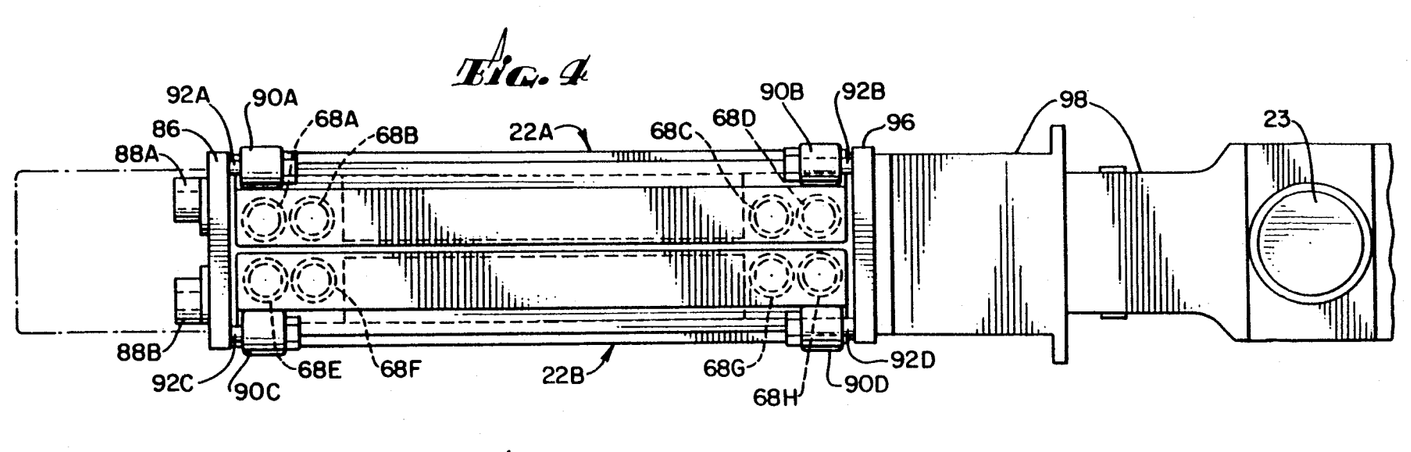
FIG. 4 is a top plan view of the gripper of the present invention.

As shown in FIGS. 2-4, two jaws 22A-B are held against external rollers 90A-D seated on shafts 92A-D, respectively. The shafts 92A, 92C and the shafts 92B, 92D are seated in bores in front endplate 86 and rear endplate 96, respectively. The rollers 90A, 90C are seated on the shafts 92A, 92C situated in bores in the endplate 86 so that the rollers 90A, 90C contact the outside of a first substantially vertical portion 46 of the jaws 22A-B, respectively. The endplate 86 is held to the assembly by collars 88A-B. Similarly, the endplate 96 located at the rear end 72 of the jaws 22A-B and attached to the support 98 has shafts 92B, 92D upon which rollers 90B, 90D are seated so that the rollers 90B, 90D contact the outside of the first substantially vertical portion 46 of the jaws 22A-B, respectively. Motor-driven cams 28A-D are eccentrically mounted to camshafts 30A-B. A Worm 32 (FIGS. 3 and 13) is mounted to the motor shaft 34. The worm 32 mates with worm gears 36A-B which are seated on corresponding gear shafts 38A-B. Each of the gear shafts 38A-B is linked by an associated coupler 40A-B to a corresponding one of the camshafts 30A-B. When the motor 23 is actuated, the motor shaft 34 drives the worm 32 which in turn drives the gears 36A-B and thus the gear shafts 38A-B. In this manner, the cams 28A-D are rotated, and the jaws 22A-B are opened and closed.

Figure 6:
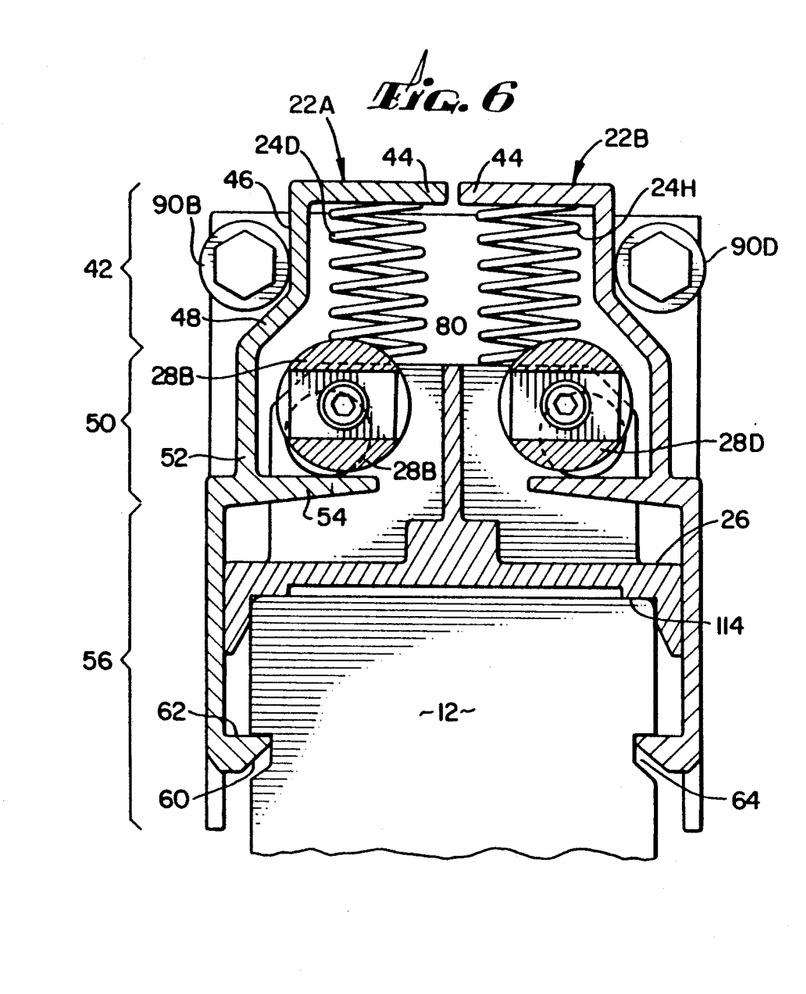
FIG. 6 is a sectional view of the gripper showing the general configuration of the jaws, springs, cams, and rollers when the gripper is grasping a cassette.
Figure 7:
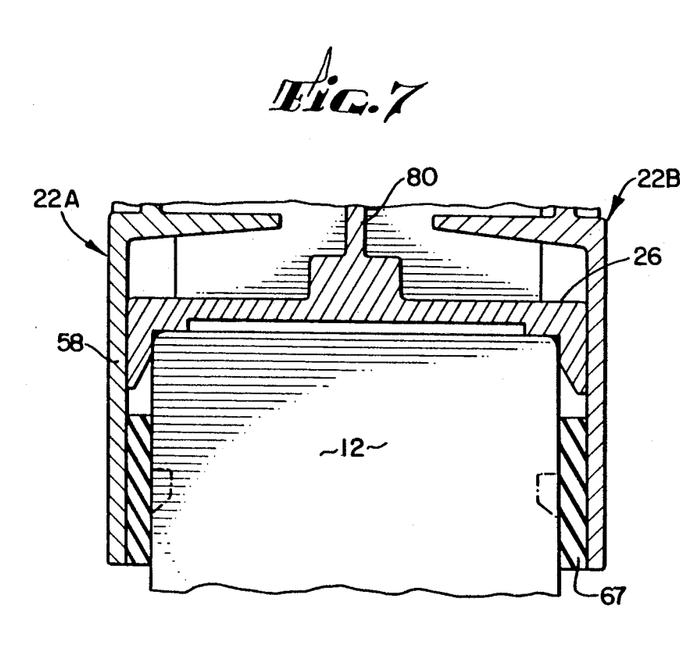
FIG. 7 is a side view of a part of the gripper jaws to which a rubber material or the like has been secured to facilitate the gripping of an article.

For ease of reference, detailed description of each of the jaws 22A-B will be made with reference to the jaw 22A only. However, the jaw 22B is the identical, obverse mate to the jaw 22A. As shown in FIG. 6, the jaw 22A has a first section 42 defined generally by a horizontal top portion 44, a first substantially vertical portion 46 extending downwardly from the top portion 44, and an inclined portion 48 extending outwardly from the base of the first substantially vertical portion 46. The second section 50 of the jaw 22A is defined generally by a second substantially vertical portion 52 extending downwardly from the inclined portion 48, and a substantially horizontal shelf 54 extending inwardly from the base of the second substantially vertical portion 52. The third section 56 is defined generally by a third substantially vertical portion 58 extending outwardly and downwardly from the second substantially vertical portion 52, and a claw 60 attached at the bottom of the third substantially vertical portion 58. The claw 60 has a slightly inclined upper surface 62 which contacts the groove 64 in the cassette 12 and also an inclined portion 66. A pad of rubber or a like material may be secured to inclined upper surface 62 of the jaw 22A to facilitate gripping and to absorb shock. Alternatively, as shown in FIG. 7, if a cassette 12 does not have a groove 64 for gripping, the jaw 22A need not have a claw 60, and a material for increasing the coefficient of friction of the jaw 22A may be mounted to that part of the jaw 22A which contacts a cassette 12. The material is selected so that when the jaws 22A-B are closed, the cassette 12 is firmly grasped. For example, a pad 67 of a suitable type of rubber may be secured along the inside of a part of the third substantially vertical portion 58 of each jaw 22A-B.

Recesses 68A-H are formed in the underside of the horizontal top portion 44 of each jaw 22A-B to accommodate the springs 24A-H, respectively (FIGS. 3-4). Two recesses 68A-B toward the front end 70 of the jaw 22A accommodate the springs 24A-B, and two recesses 68C-D toward the rear end 72 of the jaw 22A accommodate the springs 24C, 24D. Similarly, recesses 68E-H are formed in the jaw 22B to accommodate the forward springs 24E, 24F and the rear springs 24G, 24H. When the jaws 22A-B are in the closed position, each of the springs 24A-H is situated substantially vertically, and the bottom of each of the springs 24A-H is situated in a corresponding recess in the support member 26. The support member 26 is situated between the two spaced jaws 22A-B and has a front portion 76 (FIG. 5) to accommodate the springs 24A-B, 24E-F and a rear portion 78 to accommodate the springs 24C-D, 24G-H. A connecting portion 80 extends from the front portion 76 of the support member 26 to the rear portion 78 of the support member 26. Bearings 84A-B and 84E-F are located in the front portion 76 of the support member 26 and bearings 84C-D and 84G-H are located in the rear portion 78 of the support member 26, respectively.

Figure 5:
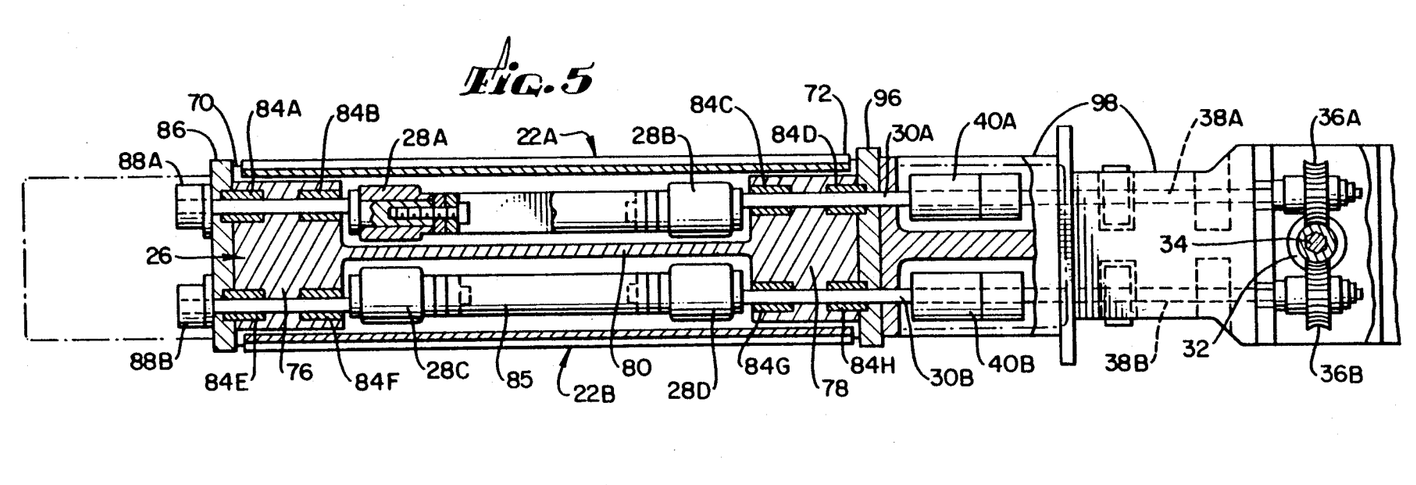
FIG. 5 is a sectional view of the gripper taken along line 5—5 of FIG. 3.

The configuration of the camshafts 30A-B and associated parts is shown in FIG. 5. For ease of discussion, only reference to the camshaft 30B will be made. However, the camshafts 30A-B are similarly configured. The bearings 84E, 84F are seated on the front end of the camshaft 30B, and the bearings 84G, 84H are seated on the rear end of the camshaft 30B. The forward cam 28C is eccentrically mounted behind the front end portion 76 of the support member 26, and the rearward cam 28D is eccentrically mounted forward of the rear portion 78 of the support member 26. The cams 28C-D are connected by an inter-connect 85 attached to each of the cams 28C-D by way, for example, of a nut-plate. The camshaft 30B extends past the front end 70 of the gripper jaw 22B, through the endplate 86, and a collar 88B is attached at the end.

Figures 12, 13:
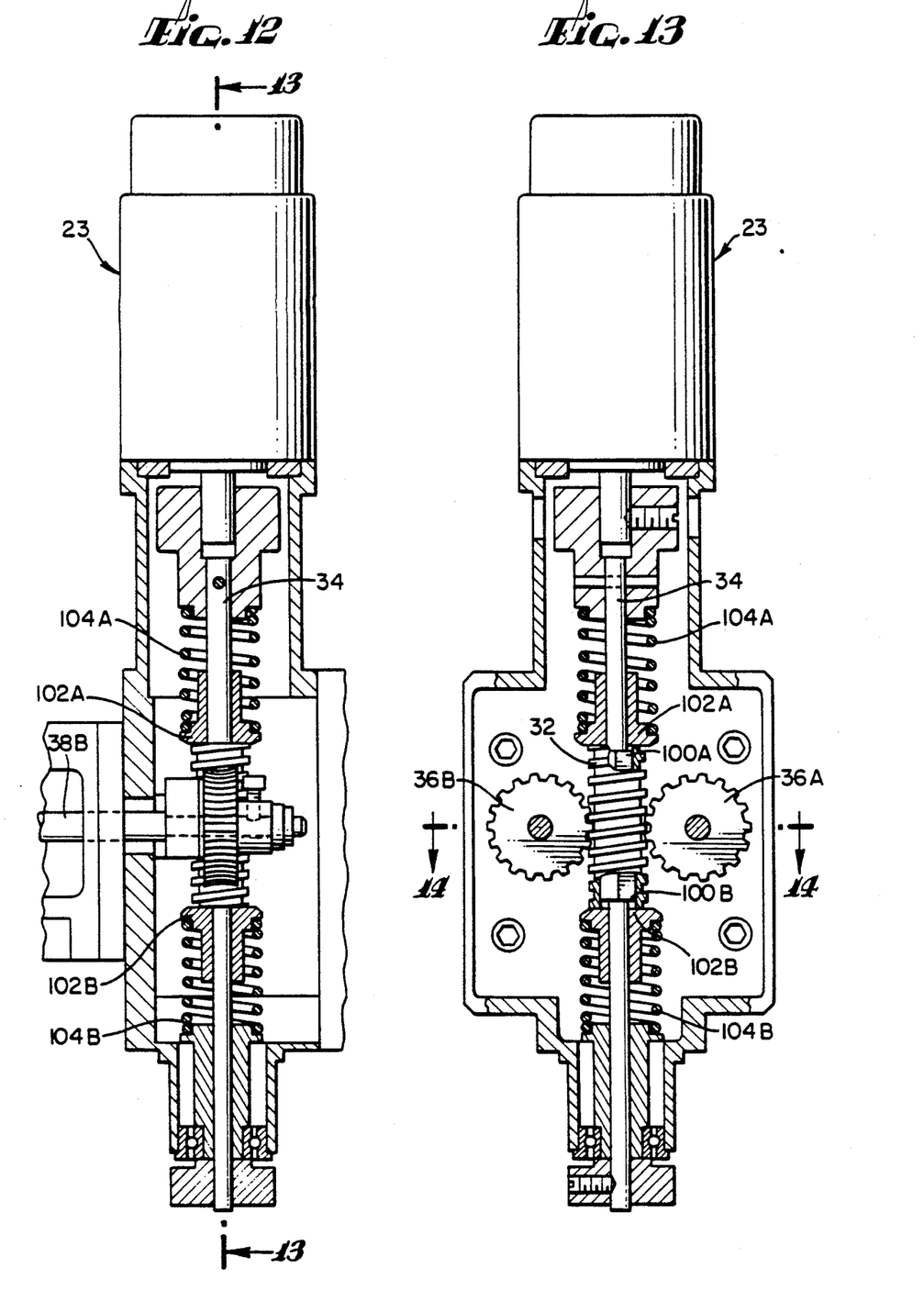
FIG. 12 is a sectional side view of the motor drive, including components for buffering the deceleration of the motor.
FIG. 13 is a rear view of the motor drive, showing the configuration of the components in a neutral position.

The camshaft 30B is operatively coupled at its rearward end to a corresponding gear shaft 38B. Each gear shaft 38A-B is equipped with a corresponding gear 36A-B (FIG. 13). The gears 36A-B mate with a worm 32 splined to the motor shaft 34. The motor shaft 34 has a shoulder 100A above the worm 32 upon which a first slidable sleeve 102A sits. Also, the motor shaft 34 has a shoulder 100B located below the worm 32 upon which a second slidable sleeve 102B sits. A spring 104A is seated on the first slidable sleeve 102A, and a spring 104B is seated on the second slidable sleeve 102B. In this manner, the springs 104A-B are decoupled. At the end opposite the slidable sleeves 102A-B, each of the springs 104A-B respectively seats on a shoulder of a block or the like. When the motor shaft 34 rotates, for example, in a clockwise direction, the gear 36A rotates in one direction, e.g., a counterclockwise direction, and the gear 36B rotates in the opposite direction, e.g., in a clockwise direction. The gear shafts 38A-B rotate in the counterclockwise and clockwise directions, respectively, and camshafts 30A-B and corresponding cams 28A, 28C and 28B, 28D are rotated in the counterclockwise and clockwise directions, respectively. In this manner, the jaws 22A-B are opened and closed.

In many cases, the gripper 10 may be required to perform thousands of consecutive load and unload operations. Thus, a high-speed motor 23 is used, e.g., a motor which attains a velocity of 8000 rpm in just 80 milliseconds. In order to achieve greater efficiency, it is desired that the motor 23 is operated at maximum speed so that load and unload operations may be performed as quickly as possible. The gripper 10 of the present invention employs a motor deceleration buffer which permits the motor 23 to be operated at maximum speed until a load or unload action of the jaws 22A-B is completed, i.e., the motor 23 need not be decelerated until after the movement of the jaws 22A-B is completed. Cam rotation is stopped by, for example, providing each of the gears 36A-B with a corresponding hard stop, e.g., a pin (not shown) carried in the gear housing, which stops its rotation. Hard stops can be placed anywhere along the camshaft drive system to effectively stop rotation of the cams 28A-D.

Figures 14, 15:
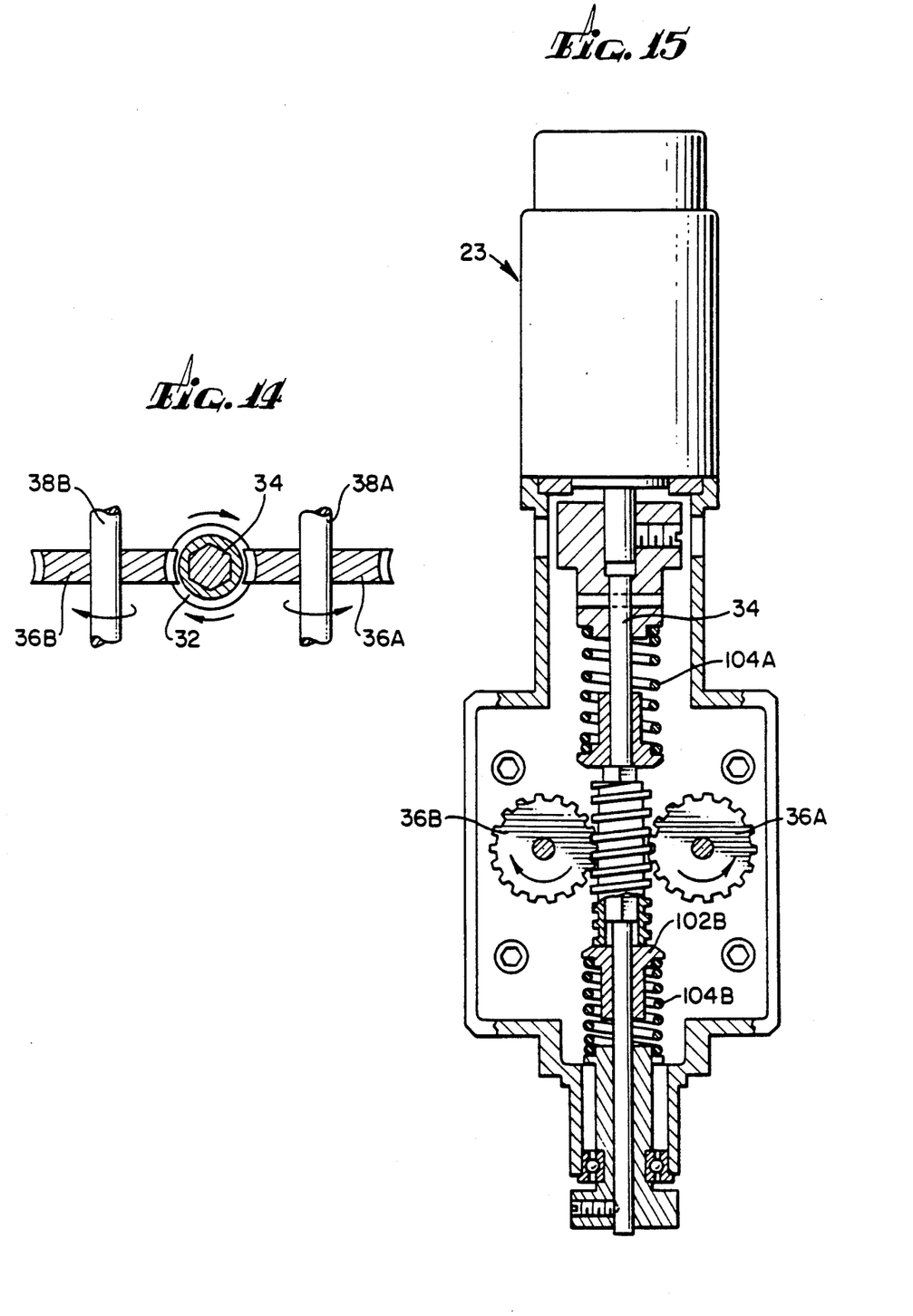
FIG. 14 is a view of the motor drive taken along lines 14—14 of FIG. 13.
FIG. 15 is a rear view of the motor drive, showing the configuration of the components when the motor has been de-energized, the worm gears have contacted their corresponding hard stops, and the worm has moved down the motor shaft so as to compress the spring.

The worm 32 is splined to the motor shaft 34 so that it rotates with the shaft 34 and is slidable along the motor shaft 34. When the motor 23 is de-energized and the gears 36A-B are stopped by the hard stops, the worm 32 continues to rotate as the motor decelerates. Since the gears 36A-B are stopped, the worm moves either up or down the motor shaft 34 depending on the rotational direction of the motor shaft 34. If, for example, as shown in FIG. 15, the motor shaft 34 is rotating in a direction so that the worm 32 moves downward when the gears 36A-B contact their corresponding hard stops, then the worm 32 contacts the slidable sleeve 102B and pushes it downward in opposition to the spring 104B, thus buffering, or absorbing, the deceleration of the motor 23. The spring 104B is selected to have a coefficient of spring force such that when the gears 36A-B are stopped, the gears 36A-B are locked. That is, the spring 104B applies a moment to each of the gears 36A-B, thereby locking the gears 36A-B and thus the cams 28A-D. The gears 36A-B can therefore rotate only when the motor shaft 34 (and therefore the worm 32) is rotated.

As noted previously, the tops of the springs 24A-H contact the horizontal top portion 44 of the jaws 22A-B, and the bottoms of the springs 24A-H contact the support member 26 as shown in FIG. 6. Each of the springs 24A-H has a coefficient of spring force such that when the jaws 22A-B are closed, the cassette 12 is firmly grasped. Most of the gripping force is applied in the shear plane of the cassette 12, i.e., the most rigid plane. When the jaws 22A-B are in the closed position as in FIG. 6, the cams 28A-D do not contact the jaws 22A-B. The grip is achieved by the force of the springs 24A-H urging the jaws 22A-B against the rollers 90A-D.

The movement of the jaws 22A-B from a closed to an opened position and vice versa corresponds to a predetermined camshaft rotation. The motor 23 is de-energized when a sensor 112 (FIG. 3) detects that the camshafts 30A-B have rotated the predetermined amount, e.g., 180°. Thus, the rotation of the camshafts 30A-B is used to control the timing of the de-energization of the motor 23 during a load operation.

FIGS. 8-11 show the relationship between various elements as the jaws 22A-B move from an opened to a closed position to grip a cassette 12. For ease of discussion, reference will be made only to the elements shown in FIGS. 8-11. However, like elements not shown in these figures operate similarly. In the illustrated case, the gripper 10 is not accurately aligned with the cassette 12. That is, the gripper 10 has been positioned by the accesser 20 such that the cassette 12 is located below the vertical registration surface 114, by, e.g., 3/16".

Figure 9:
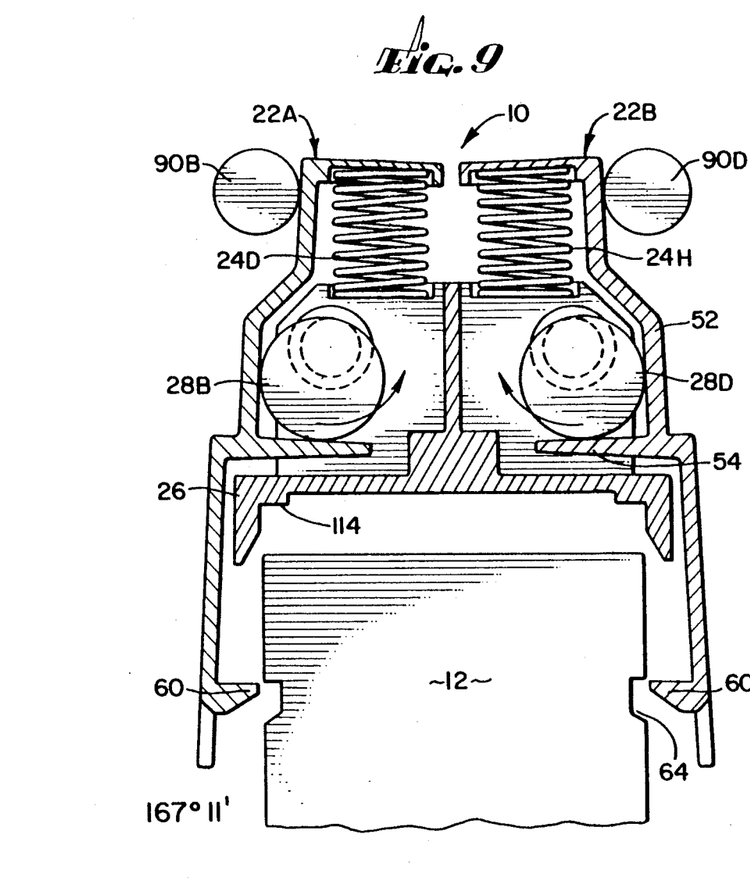
FIG. 9 is a sectional view showing the relationship between the jaws, springs, cams, and rollers when a grip has been actuated and the jaws are just engaging the grooves of a cassette.
Figure 10:
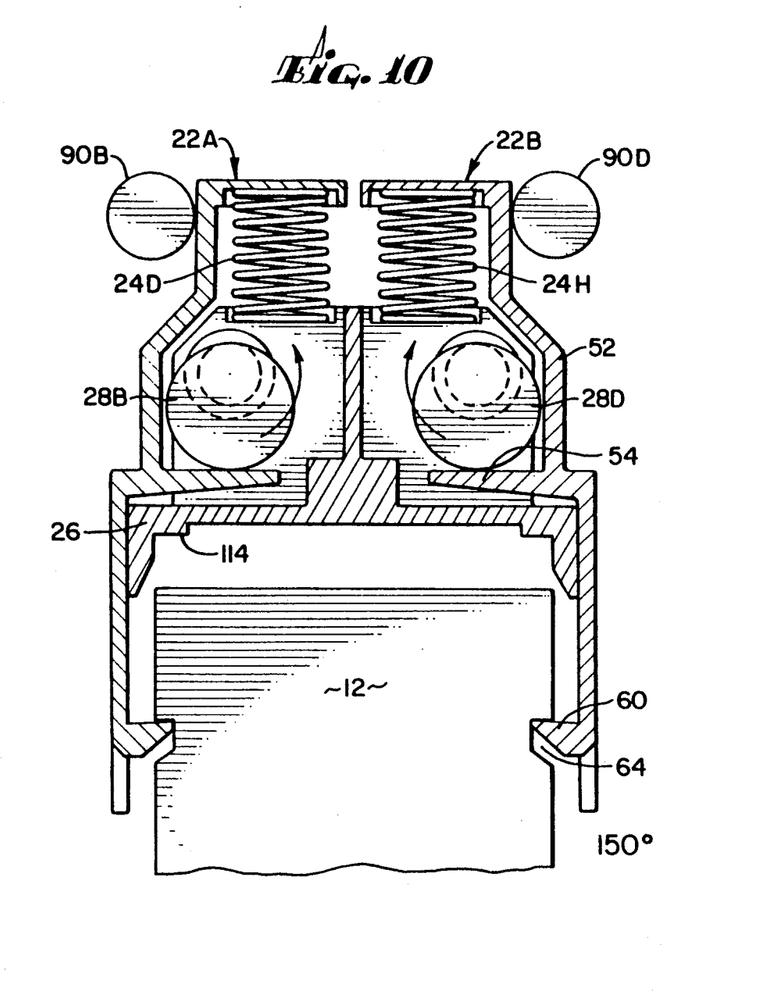
FIG. 10 is a sectional view showing the relationship between the jaws, springs, cams, and rollers when the jaws have fully engaged the grooves of the cassette, and the jaws are at their lowest point in a load or unload operation.
Figure 11:
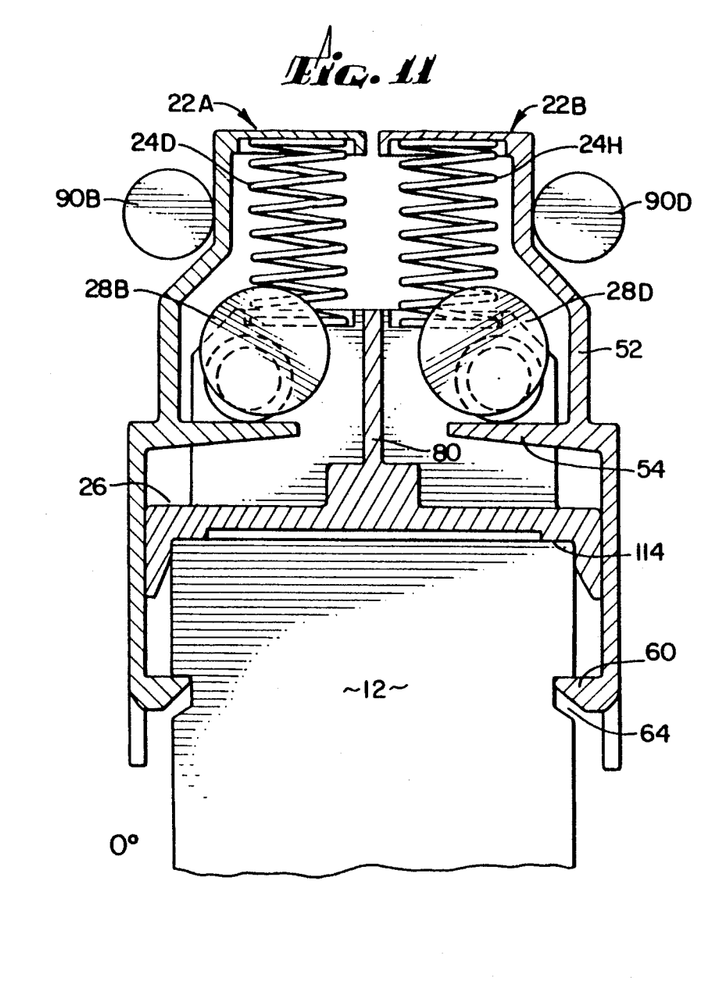
FIG. 11 is a sectional view showing the relationship between the jaws, springs, cams, and rollers when the jaws have been closed so as to draw the cassette into the grasp of the gripper.

FIG. 8 shows a configuration in the 180° position, i.e., the fully opened position. The cams 28B, 28D push down on the substantially horizontal shelf 54 and also push outwardly on the second substantially vertical portion 52 of each jaw 22A-B, respectively. In this manner, the jaws 22A-B are pushed outward, and the springs 24D, 24H are further compressed. The rollers 90B, 90D oppose the forces of the cams 28B, 28D. FIG. 9 shows a 167 11' position, i.e., the position after the cams 28B, 28D have rotated 12° 49' in a clockwise direction from the 180° position. The springs 24D, 24H pull the jaws 22A-B, and the claw 60 of each jaw 22A-B engages the groove 64 in the cassette 12. FIG. 10 shows a 150° position, i.e., the cams 28B, 28D have rotated 30 in a clockwise direction from the 180° position. In this position, the jaws 22A-B are at their maximum reach, i.e., their maximum downward position during an open or close operation. The claw 60 is firmly engaged in the groove 64 in the cassette 12 and the cassette 12 is at its lowest position. The cams 28B, 28D push down on the substantially horizontal shelf 54 but do not contact the second substantially vertical portion 52 at all. FIG. 11 shows a 0° position, i.e., the cams 28B, 28D have rotated 180° in a clockwise direction from the original 180° position. In the 0° position, the cams 28B, 28D do not contact the jaws 22A-B at any point. The jaws 22A-B are pulled up by the forces of the springs 24D, 24H, and the claw 60 is firmly engaged in the groove 64 of the cassette 12. As the jaws 22A-B are closed, the jaws 22A-B smoothly move upwardly and inwardly against the rollers 90B, 90D and draw the cassette 12 up into alignment with the vertical registration surface 114. This loading operation takes only a very short period of time, e.g., 80 milliseconds.

Of course, if the accesser 20 precisely aligns the gripper 10 with the cassette 12, then the jaws 22A-B close laterally so as to engage the grooves 64 of the cassette 12; the cassette 12 is not carried downward and then pulled up as in the case previously described. Furthermore, the accesser 20 may position the gripper 10 such that the vertical registration surface 114 bears down on the cassette 12 and the jaws 22A-B are located below the grooves 64 in the cassette 12. In this case, the jaws 22A-B are closed to contact the cassette 12 below the grooves 64, and the springs 24D, 24H pull the jaws 22A-B up into engagement with the grooves 64 of the cassette 12.

As mentioned previously, the cams 28A-D do not contact the jaws 22A-B at any point in the closed, i.e., 0°, position. The grip is achieved by way of the springs 24A-H acting against the rollers 90A-D, and due to the nature of springs, the gripper 10 is quite forgiving. Thus, a cassette 12 need not be perfectly aligned in its storage bin 14 for the gripper 10 to function effectively, and the accesser 20 is not required to accurately align the gripper 10 with the cassette 12. For example, the gripper 10 of the present invention, when constructed in accordance with the preferred embodiment, registers to 0.001" and has a vertical tolerance of 3/16", a widthwise tolerance of ±1/16", and a horizontal tolerance of ⅛".

The best presently contemplated mode of carrying out the present invention has been described. Nevertheless, it should be understood that various modifications may be made without departing from the spirit and scope of the invention. For example, although the present invention has been described with reference to cassettes, it is suitable for grasping any article compatible with the jaws of the gripper. This includes an article adapted to be compatible with the jaws of the gripper, e.g., an article with rounded sides having an appropriate receiver attached. Also, it is envisioned that elastic devices other than springs may be used as force means, and hold means other than rollers may be used. Additionally, the gripper is not limited to the orientation described. For example, the gripper can be positioned so as to grasp an article from the side rather than from the top. Also, the number of elements required, such as springs, cams, or bearings, depends on the specific application. Additionally, other means for stopping cam rotation may be used. For example, rather than at the worm gears, hard stops may be placed at other points along the camshaft drive system. Furthermore, the means for buffering the deceleration of the motor has use in various applications requiring high-response braking. Accordingly, it is to be understood that the present invention is not to be limited by the specific illustrated embodiment, but only by the scope of the appended claims.

I claim:

1. A gripper for grasping an article, comprising:
   first and second spaced jaws movable toward each other to grasp opposite sides of an article;
   a support member situated between the jaws; cams operable to move each of the jaws;
   force means contacting the support member and an inner surface of each jaw, for exerting force against each jaw; and
   hold means contacting an outer surface of each jaw for exerting force in opposite to the force means;
   wherein the cams do not contact the jaws in a grip mode and the article is held between the jaws by way of the force means acting against the hold means.

2. A gripper as in claim 1, wherein the hold means comprises rollers.

3. A gripper as in claim 1, wherein the force means comprises springs.

4. A gripper as in claim 1, further comprising a motor operable to drive the cams, wherein the cams are seated on camshafts and wherein the cams can be rotated by a limited amount, the amount being defined by a first stop position and a second stop position, further comprising means for locking the cams comprising:
   a worm situated on a shaft of the motor so as to be driven when the motor shaft rotates;
   worm gears mating with the worm so as to be driven by the motor-driven worm, each worm gear being operatively coupled to a corresponding one of the camshafts and being rotatable first and second predetermined amounts corresponding to the first and second stop positions, respectively; and
   a spring located on the motor shaft adjacent the worm;
   wherein when each of the worm gears has rotated one of the first and second predetermined amounts, rotation of the cams is stopped, and the worm moves along the motor shaft and compresses the spring.

5. A gripper as in claim 1, wherein each jaw has a first section, an upper part of which contacts the force means, a second section which contacts a corresponding one of the cams when the cam is operated to move the jaw, and a third section which contacts a part of a grasped article.

6. A gripper as in claim 1, wherein each jaw has a claw for contacting an article to be grasped.

7. A gripper as in claim 1, wherein a material is secured to a part of each jaw which contacts an article for gripping so that the part of each jaw having the material attached has a higher coefficient of friction.

8. A gripper as in claim 1, having a surface for achieving vertical registration of the article with respect to the gripper, wherein the cams are eccentrically mounted to corresponding camshafts;
   wherein when the article is misaligned such that it is situated below the vertical registration surface, and the cams are rotated so as to move the jaws from an opened to a closed positioned, the jaws compress the force means, move laterally to contact opposite sides of the article, and then further compress the force means so that the article is carried away from the vertical registration surface to the lowest point of travel of the article, and then the force means extend so that the jaws draw the article into substantially precise alignment with the vertical registration surface;
   wherein when the article is precisely aligned with respect to the vertical registration surface, and the cams are rotated to move the jaws from an opened to a closed position, the jaws move laterally to contact opposite sides of the article, thereby grasping the article; and
   wherein when the article is misaligned such that the vertical registration surface bears down on the article, and the cams are rotated to move the jaws from an opened to a closed position, the jaws contact opposite sides of the article and the force means extend to move the jaws so that the article is in substantially precise alignment with respect to the vertical registration surface.

9. A gripper for grasping a cassette, comprising:
   first and second spaced jaws movable toward each other to grasp opposite sides of a cassette;
   a support member situated between the jaws;
   cams for moving each of the jaws;
   a motor for driving the cams;
   rollers attached to stationary members fastened to the support member, the rollers contacting an outer surface of each jaw; and
   springs contacting the support member and an inner surface of each jaw so that the jaws are held against the rollers by the force of the springs;
   wherein the cams do not contact the jaws in a grip mode so that the cassette is held between the jaws by the springs acting against the rollers.

10. A system for grasping an article, comprising:
    a gripper assembly comprising first and second spaced jaws movable toward each other to grasp opposite sides of an article; a support member situated between the jaws; cams operable to move each of the jaws, each cam being seated on a rotatable shaft; a motor operable to drive the cams; force means contacting the support member and an inner surface of each jaw, for exerting force against each jaw; and hold means attached to stationary members fastened to the support member, for exerting force in opposition to the force means, the hold means contacting an outer surface of each jaw; and
    an accesser operatively connected to the gripper assembly for moving the gripper assembly toward the article so that the article is situated between, but not in contact with, the jaws;
    wherein when the gripper assembly is in a grip mode, the motor is de-energized when a sensor detects that the shafts upon which the cams are seated have rotated a predetermined amount.

11. A system as in claim 10, wherein the article has grooves for gripping.

12. A system as in claim 10, wherein each jaw has a claw for engaging a corresponding groove in the article.

13. A system as in claim 10, wherein a material is secured to a part of each jaw which contacts an article for gripping so that the part of each jaw which has the material attached has a higher coefficient of friction.

14. A method of grasping an article with gripping members operatively connected to an accesser, comprising the steps of:
- spring-loading each of the gripping members with springs;
- moving the gripping members toward the article by way of an accesser so that the article is situated between the gripping members and there is no contact between the gripping members and the article; and
- driving cams to move the gripping members toward each other to contact opposite sides of the article so that the article is pulled by the force of the springs into the grasp of the gripping members and the cams do not contact the gripping members in a grip mode.

15. A grasping device, comprising:
- gripping members, each movable to a gripping position in which an article may be grasped and a non-gripping position;
- at least one support member situated between the gripping members;
- cams operable to move the gripping members to and from the gripping and non-gripping positions;
- force means contacting the support member and an inner surface of each gripping member, for exerting force against each gripping member; and
- hold means contacting an outer surface of each gripping member for exerting force in opposition to the force means;
- wherein when the gripping members are in the gripping position, grasping of the article is achieved independently of the cams by way of the force means acting against the hold means.

* * * * *